(12) United States Patent
Aspen

(10) Patent No.: US 8,340,837 B2
(45) Date of Patent: Dec. 25, 2012

(54) METHODS AND SYSTEMS FOR GENERATING EN-ROUTE VISIBLE TERRAIN DISPLAYS

(75) Inventor: Sven D. Aspen, Sherwood, OR (US)

(73) Assignee: The Boeing Company, Chicago, IL (US)

( * ) Notice: Subject to any disclaimer, the term of this patent is extended or adjusted under 35 U.S.C. 154(b) by 217 days.

(21) Appl. No.: 11/548,461

(22) Filed: Oct. 11, 2006

(65) Prior Publication Data

US 2007/0150125 A1    Jun. 28, 2007

Related U.S. Application Data

(60) Provisional application No. 60/756,256, filed on Dec. 22, 2005.

(51) Int. Cl.
| | |
|---|---|
| G01C 23/00 | (2006.01) |
| G05D 1/00 | (2006.01) |
| G05D 3/00 | (2006.01) |
| G05D 1/06 | (2006.01) |
| G06F 7/00 | (2006.01) |
| G06F 17/00 | (2006.01) |

(52) U.S. Cl. .............................................. 701/3; 701/8
(58) Field of Classification Search .................... 701/3, 8
See application file for complete search history.

(56) References Cited

U.S. PATENT DOCUMENTS

| | | | |
|---|---|---|---|
| 4,876,651 A | 10/1989 | Dawson et al. | |
| 5,920,276 A | 7/1999 | Frederick | |
| 5,936,552 A * | 8/1999 | Wichgers et al. | 340/963 |
| 6,038,498 A | 3/2000 | Briffe et al. | |
| 6,092,009 A | 7/2000 | Glover | |
| 6,112,141 A | 8/2000 | Briffe et al. | |
| 6,747,649 B1 | 6/2004 | Sanz-Pastor et al. | |
| 6,828,922 B1 | 12/2004 | Gremmert et al. | |
| 7,095,423 B2 | 8/2006 | Cosman et al. | |
| 2001/0056316 A1 | 12/2001 | Johnson et al. | |
| 2004/0059472 A1 | 3/2004 | Hedrick | |

(Continued)

FOREIGN PATENT DOCUMENTS

EP    1067478 A2    1/2001

OTHER PUBLICATIONS

International Search Report of PCT/US2006/047317; Jul. 16, 2007; 12 pages.

*Primary Examiner* — Thomas H. Tarcza
*Assistant Examiner* — Imran Mustafa
(74) *Attorney, Agent, or Firm* — Armstrong Teasdale, LLP

(57) ABSTRACT

Methods and systems for displaying an en-route visible terrain display for an aircraft are provided. The method includes representing each pixel of a terrain display using a geographical location and an elevation above the location, each pixel further represented using at least one of a color value and a grayscale value, receiving a minimum elevation value, setting the at least one of a color value and a grayscale value of the pixels represented by an elevation value less than the received minimum elevation value to a uniform value, and displaying the en-route visible terrain display such that pixels representing terrain that includes an elevation value less than the minimum elevation value are displayed with the uniform value such that non-terrain-impacted, primary-navigation areas of the display are more easily readable.

17 Claims, 4 Drawing Sheets

U.S. PATENT DOCUMENTS

| | | |
|---|---|---|
| 2004/0059473 A1* | 3/2004 | He .................................... 701/4 |
| 2004/0083038 A1 | 4/2004 | He |
| 2004/0160341 A1* | 8/2004 | Feyereisen et al. ........... 340/970 |
| 2004/0169663 A1 | 9/2004 | Bernier |
| 2005/0066275 A1* | 3/2005 | Gannon ....................... 715/700 |
| 2005/0137758 A1* | 6/2005 | He et al. .......................... 701/3 |
| 2005/0200502 A1* | 9/2005 | Reusser et al. ................ 340/973 |
| 2005/0264567 A1 | 12/2005 | Sommers |
| 2005/0264576 A1 | 12/2005 | Sommers |
| 2006/0069468 A1 | 3/2006 | Astrue |

* cited by examiner

METHODS AND SYSTEMS FOR GENERATING EN-ROUTE VISIBLE TERRAIN DISPLAYS

CROSS REFERENCE TO RELATED APPLICATIONS

This application claims priority to U.S. Provisional Patent Application Ser. No. 60/756,256 filed Dec. 22, 2005, the contents of which are hereby incorporated by reference.

BACKGROUND OF THE INVENTION

This invention relates generally to aircraft cockpit displays and more particularly, to methods and systems for displaying terrain maps on aircraft cockpit displays.

At least some known aircraft include cockpit displays use charts that aid in navigation and situational awareness during flight and during flight planning. Charts typically are used for a wide variety of aspects of flight and flight planning and therefore may include data that is not needed for a particular current flight segment or task, but is included for periods when the chart is used for a different task. For example, terrain depictions on a cockpit display add information that may not improve situational awareness during particular aspects of a flight or flight planning. Terrain depictions may tend to reduce features of chart symbols when the chart symbol is overlaid onto a terrain depiction. Information that is displayed but not needed for the current operation tends to create information overload in the charting environment. Excessive information that is not important to the current operation tends to generate confusion in the flight crew.

BRIEF DESCRIPTION OF THE INVENTION

In one embodiment, a method for displaying an en-route visible terrain display for an aircraft includes representing each pixel of a terrain display using a geographical location and an elevation above the location, each pixel further represented using at least one of a color value and a grayscale value, receiving a minimum elevation value, setting the at least one of a color value and a grayscale value of the pixels represented by an elevation value less than the received minimum elevation value to a uniform value, and displaying the en-route visible terrain display such that pixels representing terrain that includes an elevation value less than the minimum elevation value are displayed with the uniform value such that non-terrain-impacted, primary-navigation areas of the display are more easily readable.

In another embodiment, a display system for an aircraft includes an en-route visible terrain display screen configured to display a en-route visible terrain display representative of an area being traversed by the aircraft and a monochromatic overlay on the en-route visible terrain display screen displayed in areas of the en-route visible terrain display representative of an elevation less than a selectable minimum elevation value.

In yet another embodiment, a situational awareness system including an en-route visible terrain display is provided. The en-route visible terrain display includes a database for storing data relating to a digital elevation model of a portion of the earth's surface, wherein the model includes a plurality of pixels, said digital elevation model including a location coordinate and an elevation value associated with each pixel. The en-route visible terrain display further includes a processor coupled to the database wherein the processor is configured to receive the location coordinate and an elevation value associated with at least one pixel, receive a minimum elevation value for at least one pixel displayed on the en-route visible terrain display, determine at least one of a color value and grayscale value of the at least one pixel based on a comparison of the elevation value and the received minimum elevation value, and display a shaded terrain map comprising a plurality of the at least one pixels on the en-route visible terrain display using the location coordinate and the determined at least one of a color value and grayscale value.

DETAILED DESCRIPTION OF THE INVENTION

Figure 1:
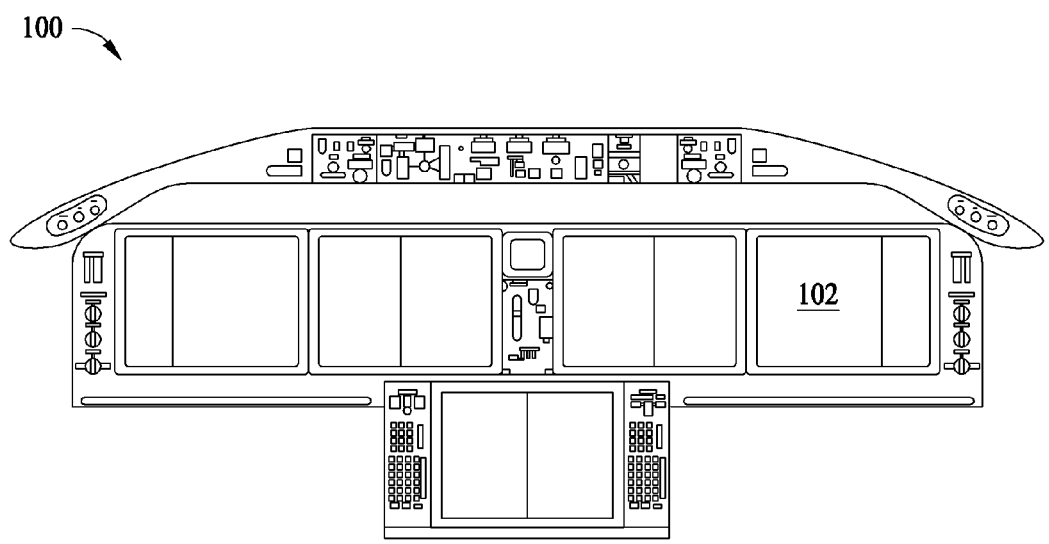
FIG. 1 is a forward perspective view of an exemplary aircraft cockpit display panel that includes at least one display screen in accordance with an embodiment of the present invention.

FIG. 1 is a forward perspective view of an exemplary aircraft cockpit display panel 100 that includes at least one display screen 102 in accordance with an embodiment of the present invention. In the exemplary embodiment, display screen is positioned on aircraft cockpit display panel 100. In an alternative embodiment, display screen 102 is positioned on an auxiliary panel (not shown) located in the cockpit of the aircraft. During aircraft operation, display screen 102 is available for viewing by a pilot and/or co-pilot of the aircraft. Display screen 102 may be used to view data included in an electronic flight bag (not shown), which may be embodied as a standalone device such as, but not limited to a PDA or laptop PC, or as a software component of a system executing on a processor that is part of a subsystem of the aircraft. In the exemplary embodiment, the electronic flight bag includes an electronic storage device configured to store various user-configurable flight-related objects for all required and desired information for a particular flight, such as flight routes, as defined by, for example, way-points, airport information, temporary flight restrictions, and weather information as well as any other user-defined objects associated with a flight, ground operations, and/or flight planning. The electronic flight bag receives data from various aircraft and ground sensors and systems, determines flight information based on the received data in real-time, and displays the flight information and/or alerts the flight crew through display screen 102 and other aural and/or visual indicators positioned on cockpit display panel 100. Such flight information provides the flight crew with additional situational awareness during all phases of aircraft operation.

Figure 2:
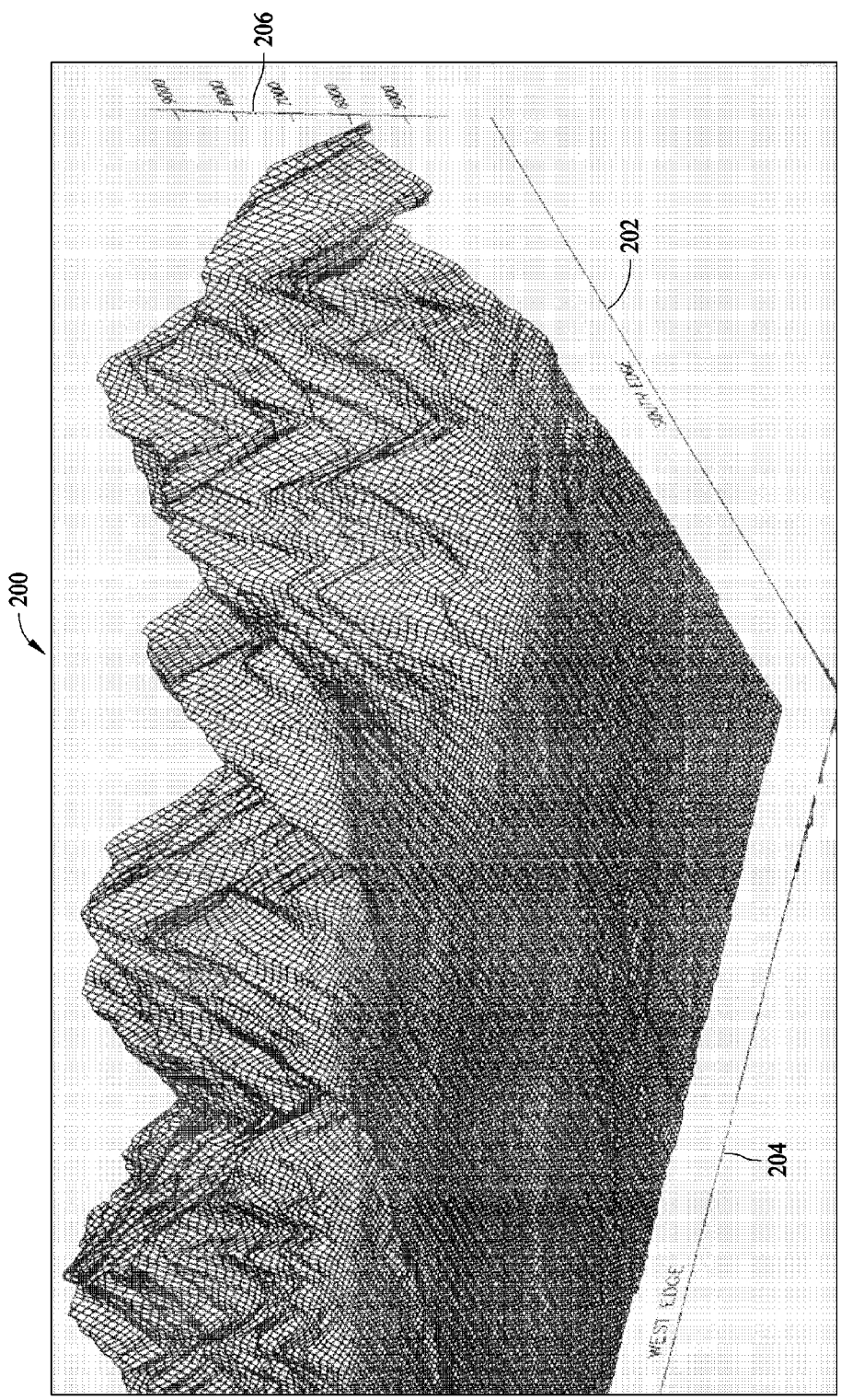
FIG. 2 is a terrain image of an exemplary area of the earth's surface.

FIG. 2 is a terrain image 200 of an exemplary area of the earth's surface. Each point or pixel on terrain image 200 is defined by a location coordinate and an elevation. In one embodiment, each pixel on terrain image 200 is represented as a geographical location on a sphere centered on the center of the earth wherein the periphery of the sphere corresponds to mean sea level. In the exemplary embodiment, a Cartesian coordinate system is used, however the coordinate system is not limited to only a Cartesian system, but rather any suitable coordinate system capable of performing the functions described herein may be used. Each pixel is located at a junction of a value along a first axis 202 and a value along a second axis 204. The pixel is further defined by a value along a third axis 206 or elevation.

Figure 3:
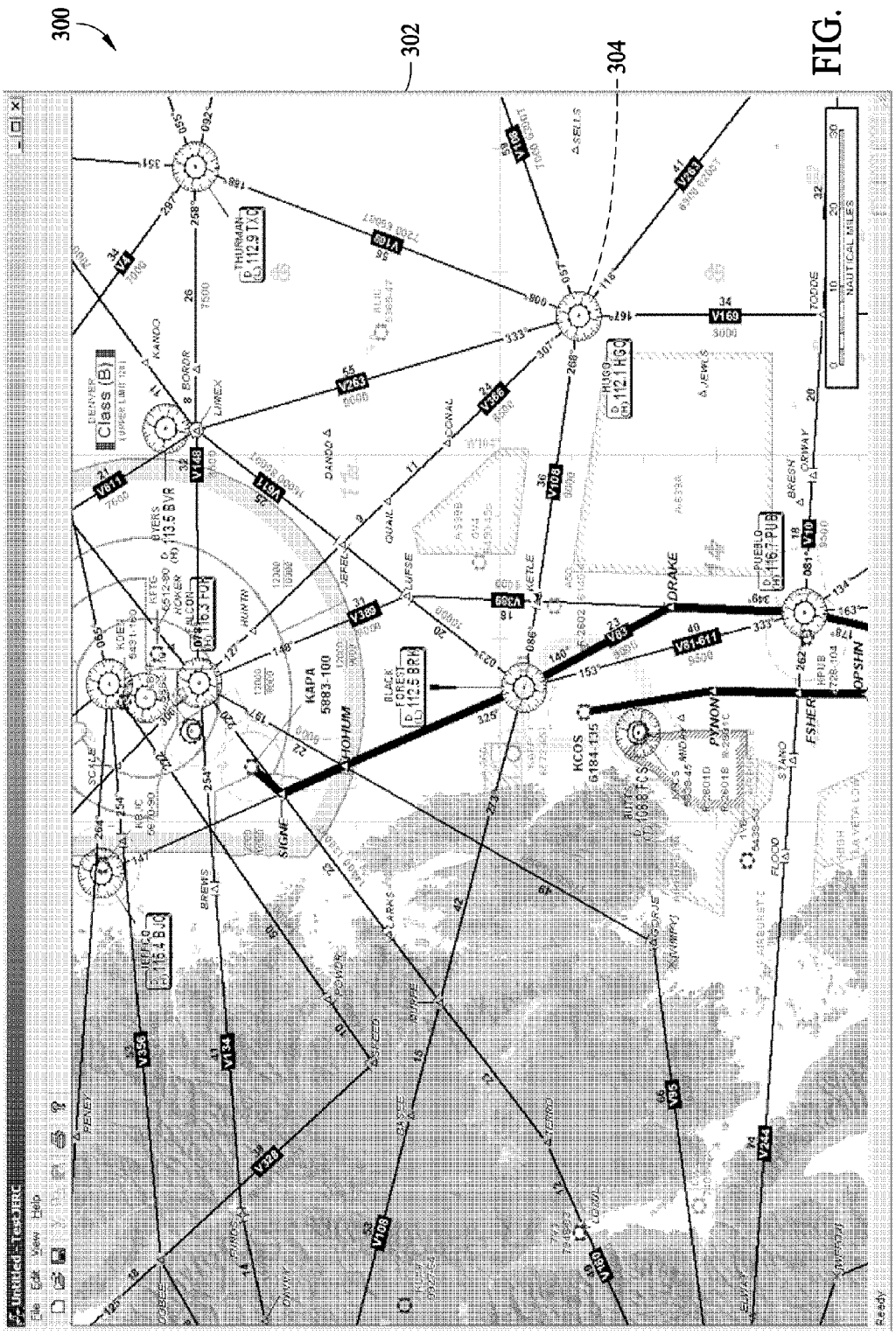
FIG. 3 is an illustration of an exemplary en-route chart display in accordance with an embodiment of the present invention.

FIG. 3 is an illustration of an exemplary en-route chart display 300 in accordance with an embodiment of the present invention. In the exemplary embodiment, chart display 300 includes a terrain map 302 and chart symbol overlay 304. Terrain map 302 includes a three-dimensional representation of the terrain in a specific area of interest, for example, an area being traversed by an aircraft. Terrain map 302 provides situational awareness for a flight crew operating the aircraft.

Chart symbol overlay 304 includes symbols that depict navaids, navaid information boxes, waypoints, VOR radials, airports, special use airspace, airway/route data such as the airway identifications, bearings or radials, mileages, and altitude. Chart symbol overlay 304 also includes symbols that depict Off Route Obstruction Clearance Altitude (OROCA). As the symbols of chart symbol overlay 304 are overlaid on top of terrain map 302 on chart display 300 during operation, the combination of terrain and symbols may create a confusing visual depiction that is difficult for the flight crew to assimilate effectively during flight operations and/or flight planning.

In the exemplary embodiment, an elevation coordinate of the pixels that comprise terrain map 302 are compared to a selectable threshold. If the elevation coordinate represents an elevation less than the selected threshold, the pixel color is replaced with a background color or grayscale intensity predetermined to provide a contrast to the color and/or grayscale intensity of the pixels that include an elevation coordinate that represents and elevation greater than the selected threshold. The exemplary method electronically mimics a look-and-feel of some terrain-impacted area and terminal charts such that a primary navigation area of the chart is a uniform background color, while shading in proximate intrusive terrain. In the exemplary embodiment, the minimum elevation threshold at which terrain is visible is set via an API function. An API function is also used to set the colormap, light-source, and contour interval.

Figure 4:
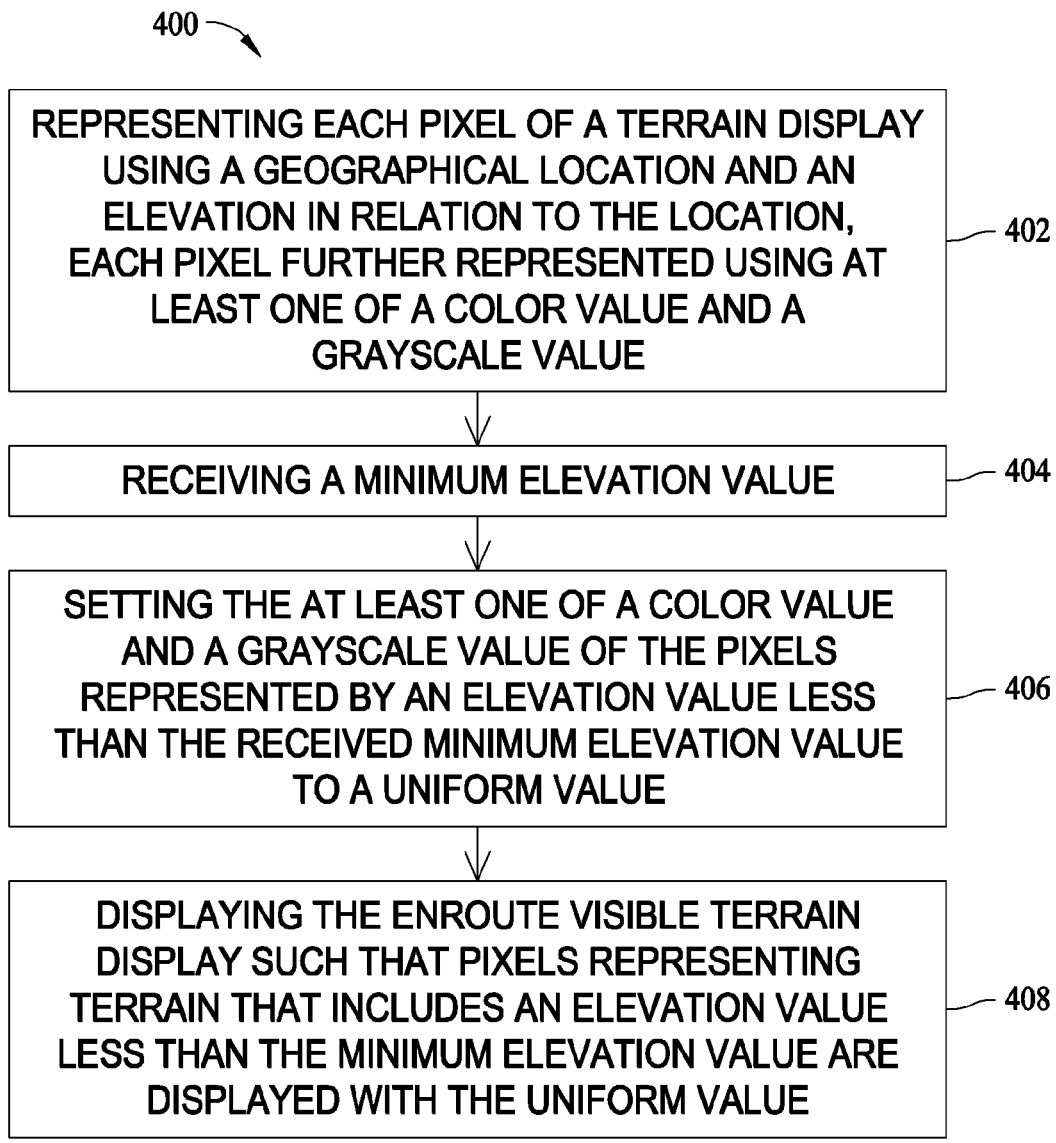
FIG. 4 is a flow chart of an exemplary method of generating an en-route visible terrain display in accordance with an embodiment of the present invention.

FIG. 4 is a flow chart of an exemplary method 400 of generating an en-route visible terrain display in accordance with an embodiment of the present invention. Method 400 includes representing 402 each pixel of en-route visible terrain display using a geographical location and an elevation above a surface of the sphere, each pixel further represented using at least one of a color value and a grayscale value. A minimum elevation value is received 404 from a user or may be received from a flight information system that determines the minimum elevation value based on the aircraft operations and current position and direction. Method 400 includes setting the at least one of a color value and a grayscale value of the pixels represented by an elevation value less than the received minimum elevation value to a uniform value. The color value or grayscale level of each pixel comprising the terrain display is predetermined to facilitate visual contrast with other elements displayed on the en-route visible terrain display. For example, a brightness control and color rendition of the en-route visible terrain display may be selected based on an illumination of the cockpit, a time of day, a direction of flight with respect to an azimuth to the sun, and/or other factors that can affect the ability of the flight crew to effectively discern the features displayed on the en-route visible terrain display. In some cases, a member of the flight crew may alter the color or grayscale level of the uniform value. The color or grayscale level may also be controlled by a software selection based on a determination of an optimal color or grayscale level for the ambient lighting conditions. The en-route visible terrain display is displayed such that pixels representing terrain that includes an elevation value less than the minimum elevation value are displayed with the uniform value. The uniform value of the pixels representing elevations below the selected minimum elevation facilitate providing an uncluttered background for the chart symbols displayed in the primary navigation area of the en-route visible terrain display. Such uncluttering of the display facilitates flight crew awareness and tends to reduce confusion caused by the clutter.

The above-described methods and systems for generating an enroute visible terrain display are cost-effective and highly reliable. Representing terrain that is at an elevation that is less than a minimum elevation as a uniform color or grayscale reduces information overload occurring in the charting environment resulting in increased safety and less confusion my making non-terrain-impacted, primary-navigation areas of the display more easily readable. Accordingly, the methods and systems for generating an enroute visible terrain display facilitate navigation and situation awareness in a cost-effective and reliable manner.

While the invention has been described in terms of various specific embodiments, those skilled in the art will recognize that the invention can be practiced with modification within the spirit and scope of the claims.

What is claimed is:

1. A method for enhancing air traffic routing visibility of certain chart symbols within an en-route chart symbol overlay on a terrain map display for an aircraft, said method comprising:

representing, in a digital elevation model, each pixel of a terrain map display, the representation using a geographical location coordinate and an elevation associated with the location, each pixel further represented in the digital elevation model using at least one of a color value and a grayscale value;

receiving a minimum elevation value for comparison with at least one of the pixels of the terrain map display, the minimum elevation value determined by a flight plan including a route of intended travel by the aircraft;

setting the at least one of a color value and a grayscale value to a uniform value for all pixels in the digital elevation model where the elevation value associated with the pixel is less than the received minimum elevation value;

displaying the visible terrain map display based on the set values in the digital elevation model such that pixels having a representation in the digital elevation model that includes the uniform value are displayed monochromatically; and overlaying the visible terrain map display pixels with the en-route chart symbol overlay, at least a portion of the chart symbols overlaid on the monochromatic portion of the terrain map such that the portion of the en-route chart symbols overlaid on the monochromatic portion of the terrain map are easily distinguishable to a user from the underlying pixels.

2. A method in accordance with claim 1 wherein displaying the visible terrain map display for an aircraft comprises displaying an en-route visible terrain map display for the aircraft during a flight planning mode.

3. A method in accordance with claim 1 wherein receiving a minimum elevation value comprises receiving a minimum elevation value selected by a user, wherein the minimum elevation value is independent of an altitude of the aircraft.

4. A method in accordance with claim 1 wherein receiving a minimum elevation value comprises receiving a minimum elevation value determined from a flight plan such that a route of intended travel by the aircraft is within an area of pixels represented in the digital elevation model with the uniform value.

5. A method in accordance with claim 1 wherein the route of intended travel by the aircraft comprises a plurality of segments and wherein receiving a minimum elevation value comprises receiving a minimum elevation value determined from a flight plan such that a next segment of a route of intended travel by the aircraft is within an area of pixels represented in the digital elevation model with the uniform value.

6. A method in accordance with claim 1 wherein the en-route chart symbols comprise aeronautical chart symbols.

7. A method in accordance with claim 1 wherein the uniform value is selected based on a current time of day.

8. A method in accordance with claim 1 wherein the uniform value is selected based on a current cockpit illumination.

9. An electronic en-route chart display for an aircraft, the electronic en-route chart display including a terrain map, said chart display comprising:

an en-route visible terrain map representative of an area being traversed by the aircraft, each pixel of the terrain map represented in a digital model by a geographical location coordinate and an elevation associated with the coordinate, all pixels associated with the terrain map represented monochromatically on said display, the minimum elevation value determined from a flight plan including a route of intended travel by the aircraft; and a plurality of en-route chart symbols overlaying the terrain map representation on said display, such that said en-route chart symbols overlaying the monochromatic representation on the display are clearly distinguishable to a user from the underlying pixels.

10. A terrain map display in accordance with claim 9 wherein said monochromatic overlay comprises a plurality of pixels having a color value substantially equal to a color value of each other pixel in the monochromatic overlay.

11. A terrain map display in accordance with claim 9 wherein said monochromatic overlay comprises a plurality of pixels having a grayscale value substantially equal to a grayscale value of each other pixel in the monochromatic overlay.

12. A terrain map display in accordance with claim 9 wherein said monochromatic overlay comprises a plurality of pixels having at least one of a grayscale value and a color value that is selectable by a user.

13. A terrain map display in accordance with claim 9 wherein said monochromatic overlay comprises a plurality of pixels having at least one of a uniform color value and a uniform grayscale value, said uniform value selected based on a current time of day.

14. A terrain map display in accordance with claim 9 wherein said monochromatic overlay comprises a plurality of pixels having at least one of a uniform color value and a uniform grayscale value, said uniform value selected based on a current cockpit illumination.

15. A system including an en-route visible terrain display comprising:

a database for storing data relating to a digital elevation model representing a portion of a terrain map associated with the earth's surface, said model correlating to a plurality of pixels in a display of the terrain, said digital elevation model including a location coordinate, and an elevation value, and at least one of a color value and a grayscale value associated with each pixel; and a processor coupled to the database, the processor configured to:

receive the location coordinates and elevation values associated with a plurality of pixels;

receive a minimum elevation value for pixels displayed on the en-route visible terrain display, wherein the minimum elevation is determined by a flight plan including a route of intended travel by an aircraft;

determine at least one of a color value and a grayscale value of the plurality of pixels based on a comparison of the elevation value for each of the plurality of pixels and the received minimum elevation value, wherein all pixels determined to be less than the minimum elevation values are represented by a uniform color or grayscale value;

display a shaded terrain map comprising a plurality of the pixels on the en-route visible terrain display using the location coordinate and the determined at least one of a color value and grayscale value; and cause en-route chart symbols associated with the terrain to be overlaid over the terrain map representation thereby making en-route chart symbols overlaying the monochromatic pixels more clearly distinguishable to a user from the underlying pixels on said display.

16. A system in accordance with claim 15 wherein the plurality of pixels form areas of uniform color or grayscale.

17. A system in accordance with claim 15 wherein said processor is further configured to display a navigation chart symbol on the en-route visible terrain map display.

* * * * *